United States Patent [19]
Newman, II et al.

[11] Patent Number: 5,813,731
[45] Date of Patent: Sep. 29, 1998

[54] HYDRAULIC PARKING BRAKE SYSTEM FOR RAILWAY VEHICLES

[75] Inventors: George A. Newman, II, Catawba; Scott W. Jones, Richmond, both of Va.

[73] Assignee: HHB Limited, L.L.C., Roanoke, Va.

[21] Appl. No.: 664,346

[22] Filed: Jun. 17, 1996

[51] Int. Cl.$^6$ ................................................ B60R 25/08
[52] U.S. Cl. ........................... 303/89; 188/265; 188/34; 188/106 F
[58] Field of Search .......................... 303/9.61, 18, 84.1, 303/89, 87; 188/34, 107, 106 F, 352, 353, 153 R, 151 A, 265, 72.4

[56] References Cited

U.S. PATENT DOCUMENTS

| | | |
|---|---|---|
| 1,254,246 | 1/1918 | Liedloff . |
| 3,508,794 | 4/1970 | Engle . |
| 3,550,731 | 12/1970 | Roselius . |
| 3,586,138 | 6/1971 | Engle . |
| 3,707,309 | 12/1972 | Engle . |
| 3,717,386 | 2/1973 | Edmansson et al. . |
| 3,724,911 | 4/1973 | Chevreux ........................ 188/106 F X |
| 3,944,286 | 3/1976 | Engle . |
| 3,995,721 | 12/1976 | Chambers .......................... 188/72.4 X |
| 4,168,865 | 9/1979 | Bogenschutz .............................. 303/89 |
| 4,175,793 | 11/1979 | Clemmons ................................. 303/89 |
| 4,553,644 | 11/1985 | Folch ...................................... 188/72.4 |
| 4,733,602 | 3/1988 | Smith et al. . |
| 4,785,918 | 11/1988 | Biamino ................................. 188/72.4 |
| 4,928,799 | 5/1990 | Zschiesche .......................... 188/352 X |
| 5,038,896 | 8/1991 | Wirth .................................. 188/265 X |
| 5,176,227 | 1/1993 | Kohler . |

FOREIGN PATENT DOCUMENTS 1 404 902  3/1975  United Kingdom .

*Primary Examiner*—Robert J. Oberleitner
*Assistant Examiner*—Pamela J. Lipka
*Attorney, Agent, or Firm*—Bacon & Thomas

[57] ABSTRACT

A parking brake system for use on a railway car includes an actuator which is adapted to be attached to a service brake actuating lever arm of the railway car and to receive a flow of non-compressible holding liquid from a reservoir through a first valve unit. The first valve unit permits the liquid to freely flow to and from the actuator in a first position and only permits flow of the liquid towards the actuator in a second position. With this arrangement, movement of the service brake actuating lever arm automatically causes the actuator to be supplied with holding liquid from the reservoir, which liquid can be selectively retained by shifting of the first valve unit to the second position. Furthermore in accordance with the invention, the actuator can be shifted by supplying pressurized holding liquid thereto through the use of a motor driven pump circuit including a pressurizable reservoir. In accordance with this embodiment of the invention, an additional valve is provided between the pressurizable reservoir and the actuator to selectively interconnect the pressurizable reservoir to the actuator. Various components of the system are preferably integrated into units which can then be interconnected. With such an arrangement, only minor attachments have to be made to retrofit an existing railway car with the parking brake system. Furthermore, the system can be incorporated in either static or pressurized modes of operation with the static system being readily convertible to a pressurized system.

50 Claims, 3 Drawing Sheets

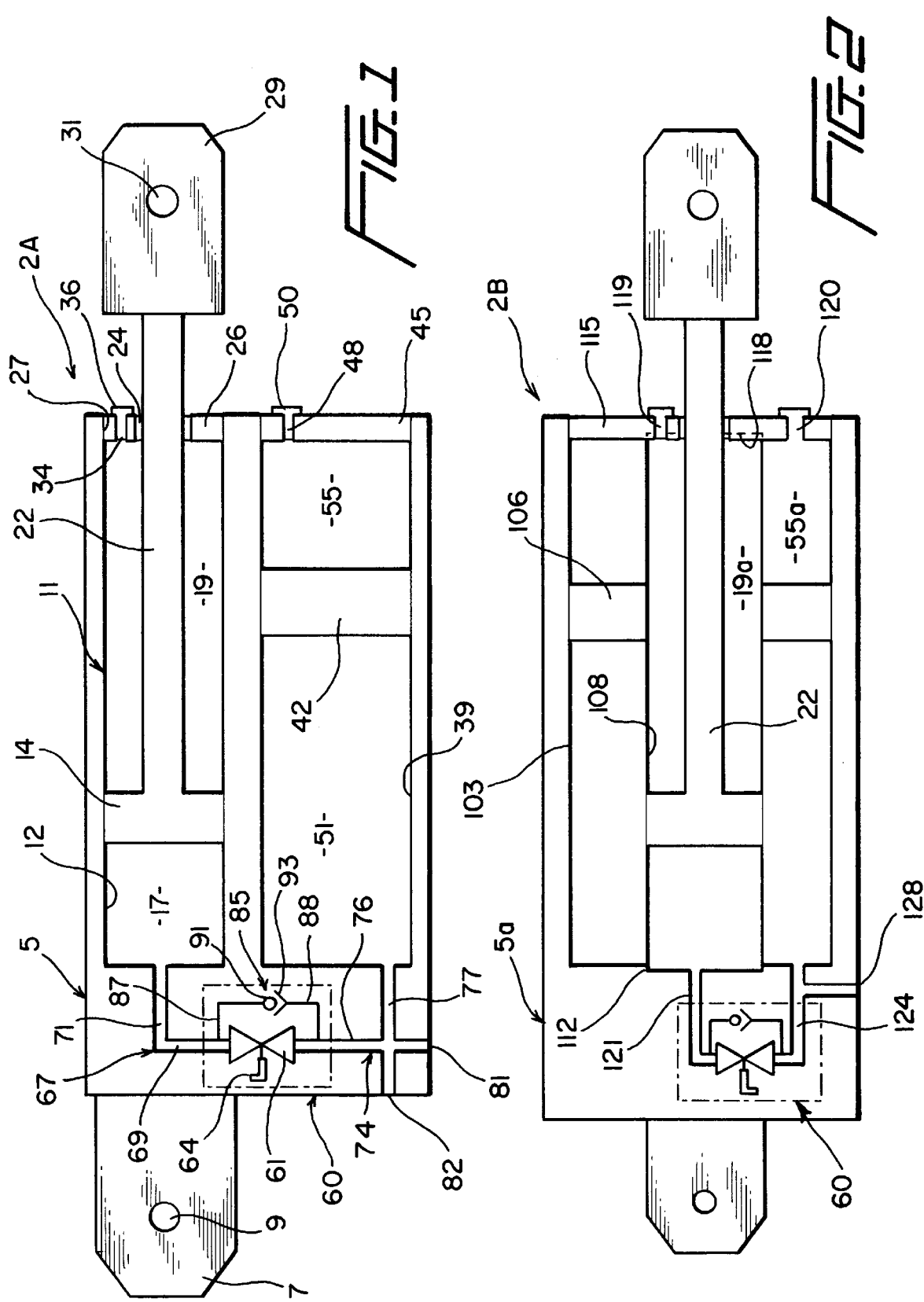

HYDRAULIC PARKING BRAKE SYSTEM FOR RAILWAY VEHICLES

BACKGROUND OF THE INVENTION

1. Field of the Invention

The present invention pertains to the railroad art and, more particularly, to an improved parking brake system for use on railway vehicles.

2. Discussion of the Prior Art

The railroad industry has an ongoing interest in improving the safety of railway systems. For instance, there has recently arisen a particular concern regarding parking or holding brake systems on freight cars. For over four decades, the freight car industry almost universally has employed a pneumatic system for the main service braking and a mechanical linkage arrangement to perform a parking or holding brake function. The pneumatic system includes a pivotally mounted lever arm which is connected to a slack adjuster for the railway wheel brake assemblies. A pneumatic linear actuator is operatively connected to the lever arm in order to pivot the arm when actuation of the main service brakes is desired.

When it is desired to engage the parking brake of such a railway car, a handwheel, accessible upon climbing a small ladder provided at the front of the car, is manually rotated. The handwheel is linked through a chain and sprocket to the lever arm. A ratchet mechanism is generally provided such that the handwheel does not slip upon the application of torque thereto. With this arrangement, once the pneumatic brake system is activated, the handwheel can be rotated to mechanically position the lever arm. Of course, the manual parking brake could be used by itself without activation of the service brake, but this would require considerably more torque to be applied to the handwheel which is made more difficult given the location of the handwheel.

Because of the compressibility of air and the differing physical strengths between operators, there will be an inherent variance in the exact holding force applied to various cars utilizing a parking brake arrangement as described above. Typically, an operator will climb the ladder on a given car and turn the handwheel until resistance is felt and then the operator must exert as much force as possible, generally in the order of eighty (80) pounds or greater, in order to adequately ratchet lock the chain. Depending on the angle of the grade upon which the car is located, the level to which car must have its brakes held to avoid undesired moving of the car will vary. Obviously, this variance can create a safety hazard.

Therefore, prior known parking brake systems for railway cars, particularly freight cars, have various associated drawbacks. Obviously there exists a safety endangerment of the operator who must climb a ladder to rotate the handwheel. Rain and ice create slippery conditions which have resulted in numerous claimed injuries in this field. In an attempt to solve this problem, various special levers have sometimes been used for rotating the handwheel without having to climb the ladder. However, claims of strained backs and necks, as well as other related injuries, continue to be fairly commonplace. In addition, these different manners of rotating the handwheels only creates a further variance in the actual torque applied to each handwheel.

Furthermore, there have been proposed railway car braking systems which are hydraulic based and therefore do not have the compressibility problems associated with conventional pneumatic systems. Unfortunately, none of these systems have been well accepted, basically because they are too complicated in construction which leads to excessive manufacturing and installation costs. Perhaps most importantly, however, these proposed systems do not easily interact with conventional service brake systems and therefore cannot be readily retrofitted to existing railway vehicles. Instead, they basically represent substitute systems designed for use with connection with new railway car installations.

Based on the above, there exists a need in the railroad art for an improved parking brake system which will overcome the deficiencies in the prior art by providing a safe and efficient parking brake system which can be used to apply a consistent brake holding force regardless of the particular strength of the operator. In addition, there exists a need for such an improved parking brake system which is cost efficient to produce and which can be readily retrofitted to existing freight cars, as well as incorporated in new cars.

SUMMARY OF THE INVENTION

The invention is directed to a parking brake system for use on railway cars, such as freight cars, flat cars, car carriers, active bottom cars and the like. The system is adapted to be readily retrofitted into existing railway vehicle braking assemblies without removing the existing service brake components so as to not interfere with the operation of the service brake. In addition, the parking brake system of the invention can be incorporated in new railway cars being built.

The parking brake system is non-compressible fluid based and incorporates an actuator which is adapted to be interposed between a conventional brake arm lever and a body portion of a railway car and which can receive a flow of the non-compressible fluid in order to maintain the brake arm lever in a vehicle braking position. More specifically, the actuator includes a piston/cylinder unit which is fluidly connected to an accumulator or reservoir housing a liquid such as hydraulic fluid. A first valve circuit is interposed between the reservoir and the actuator which opens a flow line to and from the linear actuator during operation in an off position in order that the linear actuator can freely extend and retract during normal operation of the service brakes. When the first valve circuit is shifted to an on position, fluid is permitted to enter the actuator from the reservoir, but no back flow is permitted such that the railway car brakes cannot be released. Shifting of the first valve circuit to the off position releases the parking brake. In the preferred embodiment, the first valve circuit is manually controlled and can be shifted between the off and on positions with approximately two pounds of force.

In accordance with one aspect of the invention, the parking brake system basically constitutes a slave system with a piston rod of the actuator being movable in unison with the brake arm lever of the main service brake system. Movement of the piston rod automatically causes holding liquid to be drawn into a chamber of the actuator from the reservoir. So long as the first valve circuit is in the off position, the holding liquid is free to flow back and forth between the actuator and the reservoir. Therefore, in this form of the invention, the liquid flow system between the actuator and the reservoir is sealed. In accordance with this aspect of the invention, the linear actuator, the reservoir and the first valve circuit are preferably incorporated into a single unit. In one embodiment, the cylinder of the actuator is formed as a bore in the housing which is adjacent to a bore defining the reservoir. In another embodiment, the cylinder and the reservoir are concentrically arranged. In a still further embodiment, the cylinder and the reservoir are interposed between end cap members which are interconnected by tie rods. In any case, integrating the various components eliminates the need for various hoses and fittings, thereby removing possible leak paths.

According to another aspect of the invention, the parking brake system can incorporate a pump which has an input connected to a first reservoir and an output connected to a second pressurized reservoir. The pump is preferably driven by a motor which is automatically controlled through the use of a power control switch which is responsive to sensed pressure at the second reservoir. Also interposed between the second reservoir and the actuator is another valve which can be shifted between a first position wherein the second reservoir is momentarily fluidly connected to the first valve circuit and a second position wherein the actuator is open to the first reservoir, at least when the first valve circuit is in the off position. This dynamic pressure arrangement enables the parking brake system to actuate the brakes of a railway car regardless of the functioning of the main service brake system.

Therefore, the parking brake system of the invention can be used in two modes of operation, i.e., either in a static mode without the need for the pump, motor and auxiliary circuitry or in a dynamic mode wherein pressure in the pressurized reservoir is maintained in a desired range to assure the availability of a consistent brake holding application force. In either case, the parking brake system is easy to install and will provide for enhanced overall safety to a railway car braking arrangement. Additional features and advantages of the parking brake system of the invention will become more readily apparent from the following detailed description of preferred embodiments thereof when taken in conjunction with the drawings wherein like reference numerals refer to corresponding parts in the several views.

BRIEF DESCRIPTION OF THE DRAWINGS

FIG. 1 illustrates the parking brake system according to a first preferred embodiment of the invention;

FIG. 2 illustrates a second parking brake system embodiment in accordance with the invention;

DETAILED DESCRIPTION OF THE PREFERRED EMBODIMENTS

Figure 3:
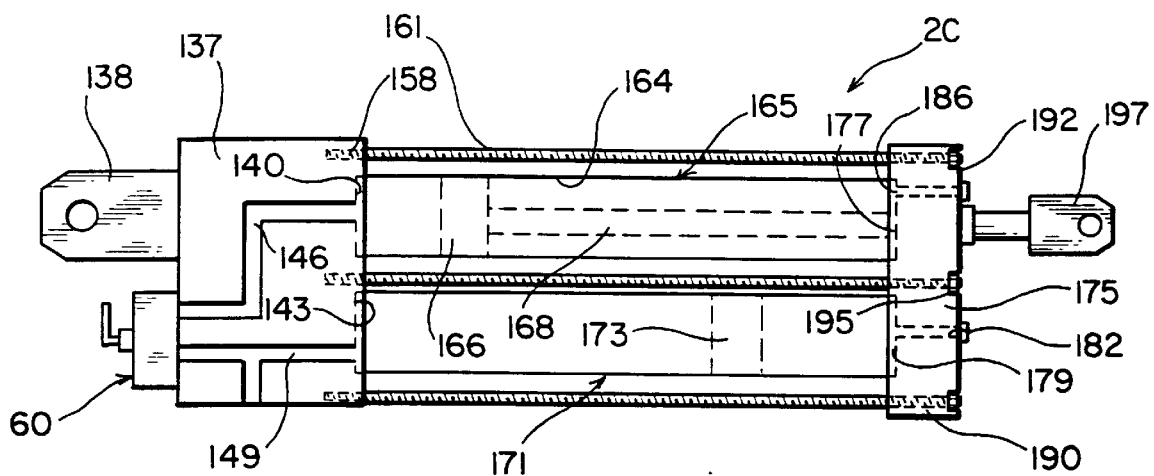
FIG. 3 illustrates another embodiment of a unitary parking brake arrangement in accordance with the invention.

The parking brake system of the present invention will initially be described with reference to FIG. 1 which illustrates a first preferred embodiment of a parking brake unit generally indicated at 2A. Parking brake unit 2A is defined by a housing 5 having fixedly secured, at one end thereof, a first clevis 7. Clevis 7 is preferably bifricated and is provided with an aligned aperture 9 used in pivotally attaching housing 5 to a body portion of a conventional railway car (not shown). Parking brake unit 2A includes an actuator 11 that preferably takes the form of a linear actuator defined by a cylinder 12 and a piston 14. In this embodiment, cylinder 12 is formed by honing a bore in housing 5. Piston 14 is movable within cylinder 12 and divides cylinder 12 into first and second chambers 17 and 19 respectively. Attached to piston 14 is a rod 22 that extends through a hole 24 formed in an end cap 26 of housing 5. In the preferred embodiment shown, end cap 26 is threadably attached to housing 5 at 27. An end of rod 22, remote from piston 14 is provided with a second clevis 29 having an aperture 31 for attaching rod 22 to a conventional main service brake actuating lever arm (see FIG. 7 below). As also shown herein, second chamber 19 of cylinder 12 is open to atmosphere through a vent hole 34 that extends through end cap 26. Attached at vent hole 34 is a filter 36 which assures that undesirable debris does not enter second chamber 19 during operation of parking brake unit 2A as will be discussed more fully below.

Housing 5 is also bored so as to also define a fluid reservoir 39. Fluid reservoir 39 also has movably mounted therein a piston 42 and is closed off by an end cap 45 provided with a vent hole 48. In a manner similar to vent hole 34, vent hole 48 is also provided with a filter 50. Piston 42 divides reservoir 39 into a first chamber 51 and a second chamber 55 which is open to atmosphere through vent hole 48. As will be discussed more fully below, first chamber 51 is adapted to house a non-compressible brake holding fluid such as hydraulic fluid.

Also carried by housing 5 is a first or flow control valve unit 60 that includes a first valve 61 controlled by a manually rotatable handle 64. First flow control valve 61 is fluidly connected to cylinder 12 through a first conduit 67 that includes a first leg 69 and a second leg 71. First or flow control valve 61 is also fluidly connected to reservoir 39 through a second conduit 74 that includes a first leg 76 and a second leg 77. As shown in this Figure, first leg 76 also extends through housing 5 to a port 81 and second leg 77 extends through housing 5 to a port 82. Either port 81 or 82 can be used for filling of parking brake unit 2A with holding fluid or draining the fluid therefrom. Each of ports 81 and 82 are plugged or otherwise sealed during normal operation. Valve unit 60 also includes a second valve 85 that is connected to first and second conduits 67 and 74 through lines 87 and 88 respectively, in parallel to first valve 61. Second valve 85 defines a one-way check valve and preferably includes a ball member 91 and a valve seat 93.

The operation of parking brake unit 2A will now be described. Once parking brake unit 2A is filled through either of ports 81 and 82 with a holding liquid such that first chamber 17 of cylinder 12, first and second conduits 67 and 74 and first chamber 51 of reservoir 39 are filled and air is bled from the circuit, parking brake unit 2A is fluidly sealed at ports 81 and 82. Parking brake unit 2A can then be attached to the conventional main service brake actuating lever arm of a railway vehicle, such as a freight car, by means of devises 7 and 29 as described above. Once attached in this manner, piston 14 and rod 22 will shift relative to cylinder 12 in unison with the movement of the conventional main service brake actuating lever arm. During such shifting, as rod 22 is extended, air in second chamber 19 will be forced out vent hole 34 and holding liquid will be drawn into first chamber 17 of actuator 11 from first chamber 51 of container 39. When first valve 61 is in an off position, holding fluid will be permitted to freely flow through first valve unit 60. Therefore, rod 22 will simply follow the movement of the conventional main service brake actuating lever arm such that parking brake unit 2A performs no auxiliary braking function. However, when it is desired to actuate parking brake unit 2A, which will correspond to a position wherein rod 22 will be extended relative to cylinder 12 due to prior actuation of the main service brakes, handle 64 of first valve 61 is shifted such that first valve 61 is placed in an on position. With this arrangement, holding fluid can only flow from first chamber 51 of reservoir 39 to first chamber 17 of cylinder 12. Neither first valve 61 nor second valve 85 will permit fluid to flow from first conduit 67 to second conduit 74. Since holding fluid is permitted to flow into first chamber 17, cylinder 12 will be continually supplied with holding fluid for the full extension of the main service brake actuating lever arm. However, once the actuating lever arm is extended, rod 22 will not be permitted to retract within cylinder 12 and therefore the railway vehicle brakes will be maintained in a parked position. Since a non-compressible fluid is utilized, the actuation of parking brake unit 2A will not be disengaged in a manner commensurate with the conventional pneumatic service brake. Of course, when it is desired to release parking brake unit 2A, handle 64 need only be shifted to again position first valve 61 in a normal, operating position and thereafter movement of the conventional brake lever arm will automatically cause piston 14 to retract within cylinder 12 which, in turn, will cause piston 42 to shift within container 39. Of course, since second chamber 55 of reservoir 39 is open to atmosphere through vent hole 48 and filter 50, there are essentially no forces prohibiting the movement of parking brake unit 2A to the release position. In addition, it should be noted that pistons 14 and 42 are annularly sealed within cylinder 12 and reservoir 39 respectively such that the amount of holding fluid in parking brake unit 2A remains constant and, as indicated above, air has been bled from this fluid circuit. Therefore, with each movement of piston 14 there is a corresponding movement of piston 42 and therefore reservoir 39 simply acts as a non-pressurized reservoir. Furthermore, since cylinder 12 and container 39 are fluidly sealed with respect to the remainder of the unit, parking brake unit 2A will function regardless of the angle at which it operates and therefore the pitch or attitude of the railway car does not adversely alter the operation of the system.

FIG. 1 illustrates a preferred embodiment wherein, as indicated above, parking brake unit 2A is defined by a housing 5 and both cylinder 12 and reservoir 39 are defined by bores associated with housing 5. It is also preferable to provide a bore or recessed area within housing 5 to mount first valve unit 60, as illustrated, with only handle 64 extending outside housing 5 such that parking brake unit 2A is formed as a unitary assembly.

FIG. 2 illustrates another embodiment of a parking brake unit 2B which is substantially identical to the embodiment of FIG. 1, but wherein a reservoir 103, having an annular piston 106, is concentrically mounted about a cylinder 108. Therefore, in this embodiment, housing 5a need only be bored to define reservoir 103 and then cylinder 108 can be inserted therein. For this purpose, housing 5a has a central machined recess 112 within which cylinder 108 is seated and an end cap 115 also has a machined recess 118 which also seats cylinder 108. End cap 115 is also provided with a pair of vent holes 119, 120 for the second chambers 19a and 55a of cylinder 108 and reservoir 103 respectively. In a manner similar to that of FIG. 1, housing 5a is formed with a first conduit 121 leading from cylinder 108 to first valve unit 60 and a second conduit 124 leading from reservoir 103 to first valve unit 60. Second conduit 124 is also open to a fill/drain port 128. In operation, the parking brake unit 2B of FIG. 2 functions in a manner identical to that described above with respect to the embodiment of FIG. 1 and therefore this operation will not be repeated here. However, arranging reservoir 103 and cylinder 108 in the concentric manner of this embodiment provides for a more compact arrangement.

FIG. 3 illustrates another embodiment, which is similar to the embodiments of FIGS. 1 and 2, but which is specifically designed for ease of manufacture. In accordance with this embodiment, a parking brake unit 2C includes a first end cap 137 to which is secured a clevis 138. First end cap 137 is provided with first and second machined recesses 140 and 143. First recess 140 is open to a first conduit 146 and second recess 143 is open to a second conduit 149. First and second conduits 146 and 149 lead to first valve unit 60 which only differs from the structure of the prior two described embodiments in that here first valve unit 60 is mounted on an exterior portion of the parking brake unit 2C. First end cap 137 is also provided with a plurality of spaced threaded apertures 158 within which respective ends (not separately labeled) of tie rods 161 are secured.

Sealed within first recess 140 is a one end of a cylinder 164 of actuator 165. Cylinder 164 houses a movable piston 166 which is secured to rod 168. Sealed within second recess 143 is a fluid reservoir 171 which itself is provided with a piston 173. Parking brake unit 2C also includes a second end cap 175 that, analogous to first end cap 137, is provided with first and second machined recesses 177 and 179 within which cylinder 164 and reservoir 171 are respectively seated. As depicted, second end cap 175 is also formed with a vent passage 182 for reservoir 171. In addition, cylinder 164 is formed with a vent 186 opening cylinder 164 to atmosphere on one side of piston 166 through second end cap 175. Second end cap 175 is also provided with a plurality of through holes 190 that terminate in enlarged openings defining recesses 192. Each tie rod 161 extends within a respective through hole 190 and respective nuts 195 are threadably secured thereto within recesses 192 to draw first and second end caps 137 and 175 together. As also shown, rod 168 has secured thereto a clevis 197 for attaching parking brake unit 2C to a railway car in the manner described above. Since the operation of parking brake unit 2C is identical to that described above with reference to the embodiments of FIGS. 1 and 2, it will not be reiterated here.

As indicated above, each of the embodiments of FIGS. 1–3 are designed for use in a static mode. That is, holding liquid flows within each of these parking brake units based solely on the movement of a conventional main service brake actuating lever arm to which it is secured. Under certain circumstances, it may be desirable to drive the parking brake unit to a braking position whether or not the service brakes on the railway car have been activated. For this reason, the invention also provides a pressure circuit generally indicated at 202 in FIG. 4 which can be readily attached to any of the parking brake units of FIGS. 1–3 or with modified parking brake units as will be discussed below. However, for this initial discussion, pressure circuit 202 is shown attached to parking brake unit 2A and, more specifically, to port 81 thereof. Furthermore, when utilized in combination with any of the parking brake units of FIGS. 1–3, the conduit opening to the adjacent reservoir associated these parking brake units are plugged such that the reservoirs are maintained inactive as will also be described more fully below.

In any event, according to the preferred embodiment depicted, pressure circuit 202 includes a first reservoir 205 that has a movable piston 208 therein which divides the reservoir 205 into first and second chambers 210 and 213 like reservoir 39 in FIG. 1. Second chamber 213 is fluidly sealed by piston 208 relative to first chamber 210 and is open to atmosphere through vent 216 that has a filter 218 attached thereto. Meanwhile, first chamber 210 is always fully filled with a supply of holding liquid. Due to this construction, it should be readily apparent that reservoir first 205 will operate equally well regardless of its angular position. First reservoir 205 is also preferably provided with a baffle 222 to separate a return zone from a supply zone (not labeled) within reservoir 205 as will become more readily apparent below.

Extending from first chamber 210 of reservoir 205 is a supply line 226 which leads to an intake of a pump 229. Pump 229 is also connected to an output line 232. In the preferred embodiment, pump 229 is driven by an electric motor 235 which is connected to a DC power source 237 through a pressure-sensitive switch 240. Although the operation of this preferred drive arrangement will be detailed below, it should be understood that pump 229 could be driven by other means, including alternating current, manual electro-mechanical, hydro-mechanical and pneumatic power sources. In output line 232 is a one-way check valve 242 which assures only unidirectional flow in output line 232 from pump 229. Although various known types of one-way valves could be utilized, check valve 242 preferably constitutes a spring-biased ball-type check valve.

Figure 4:
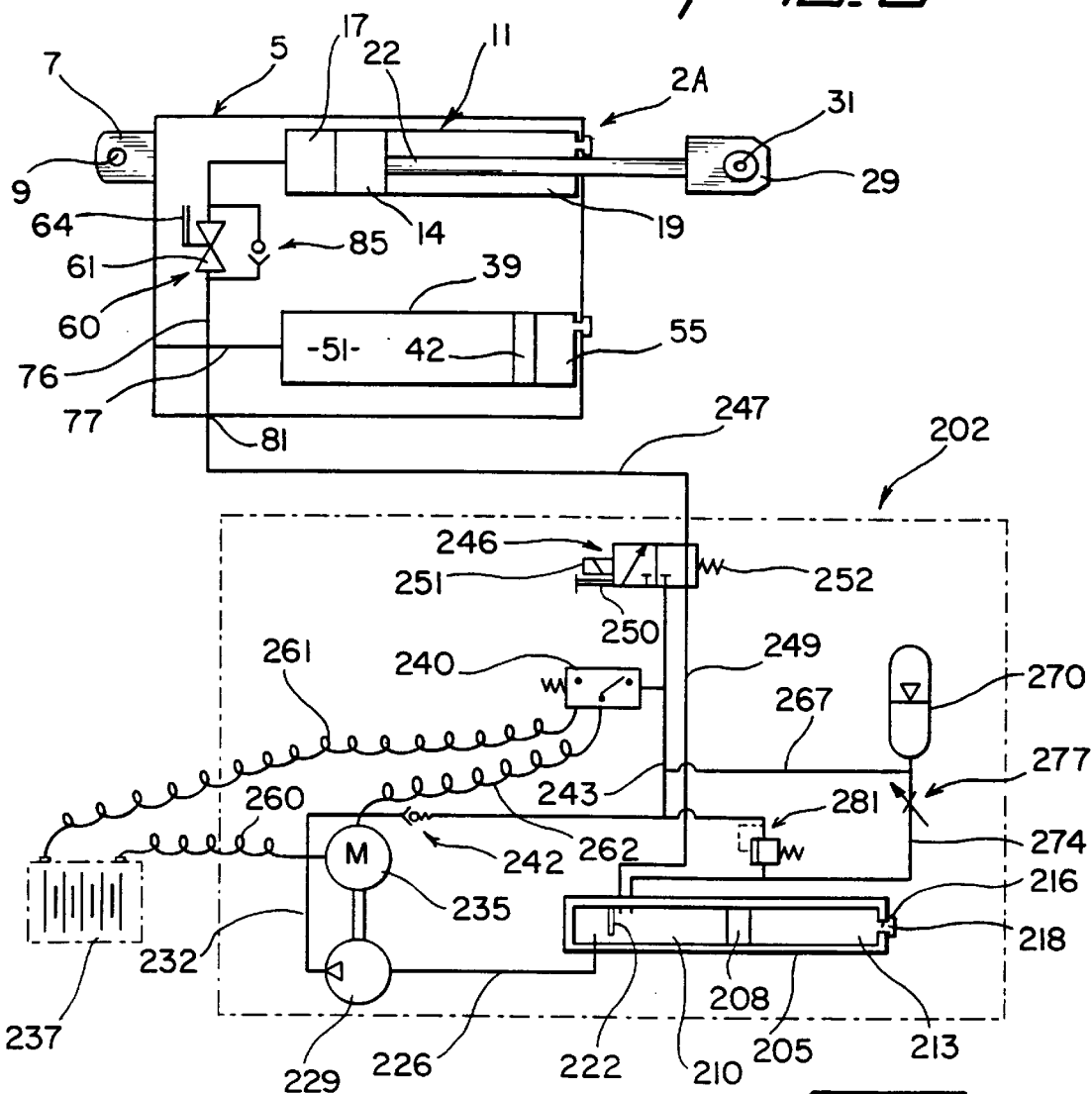
FIG. 4 is a schematic diagram of a dynamic parking brake system embodiment in accordance with the invention.

Downstream of check valve 242, output line 232 is fluidly connected to a branch line 243 which leads to a third valve 246. Third valve 246 is also joined with a line 247 that interconnects dynamic pressure circuit 202 to the drain/fill port 81 of a selected parking brake unit as described above. Since at least some railway vehicles, such as coal cars, are sometimes heated to extreme temperatures, exposed line 247 is preferably formed from a high pressure, fire sleeved hydraulic hose with SAE O-ring fittings. In addition, third valve 246 is connected to a first return line 249 that leads back to first reservoir 205 on an opposing side of baffle 222 relative to supply line 226. Third valve 246 preferably comprises a three-way, two-position manual push valve and therefore is shown to include a manual engagement member 250. It should be noted though that third valve 246 could be operated in various other manners such as through the use of a solenoid control unit also indicated in FIG. 4 at 251. Electrical push button, radio frequency controlled, laser (line-of-sight) activated and the like type valves could also be used in accordance with the invention. As depicted, third valve 246 is biased by a spring 252 to a first position wherein the fluid conduits in the parking brake unit 2A are open to first reservoir 205 as shown in FIG. 4. However, manual activation of third valve 246 causes the parking brake unit, generically indicated at 2A, to be placed in fluid communication with the output side of pump 229 as will be discussed in further detail below.

Interposed in branch line 243, between pump 229 and third valve 246, is pressure-sensitive switch 240. Switch 240 is arranged in series between power source 237 and motor 235 through power lines 260–262. In addition, switch 240 is responsive to the pressure in branch line 243 such that when the pressure in this portion of dynamic pressure circuit 202 falls below a predetermined level, generally set based on the particular class of railway vehicle to which the parking brake is applied, motor 235 will be automatically operated until the pressure sufficiently rises. Branch line 243 is connected to a pressure line 267 leading to a second reservoir 270 of the dynamic pressure circuit 202, the second reservoir being pressurizable by pump 229. With this arrangement, switch 240 is sensitive to the pressure at second reservoir 270 to control the operation of motor 235 so the pressure within reservoir 270 can be automatically maintained within a predetermined range. The reservoir 270 is also connected to first reservoir 205 through a second return line 274. Generally for the purpose of bleeding off or draining the high pressure zones of the dynamic pressure circuit 202, second return line 274 is provided with a valve 277, such as a needle valve. Finally, as clearly shown in FIG. 4, output line 232 leads back to first reservoir 205 through second return line 274 and a pressure relief valve 281.

When used in combination with pressure circuit 202, the actuator 11 of the parking brake unit 2A extend and retract in unison with the service brake actuating lever arm while being in free flow communication with first reservoir 205 through first valve unit 60 and third valve 246. Therefore, the liquid side of the system always remains flooded. In addition, since motor 235 is automatically operated through pressure-sensitive switch 240 whenever the pressure at second reservoir 270 falls below a predetermined level, the pressure circuit 202 will always possess the necessary pressure to fully extend actuator 11 and actuate/retain the brakes of the railway car. When it is desired to actuate the brakes, the operator need only re-position valve unit 60 such that holding liquid is only permitted to flow into actuator 11, then momentarily shift the position of third valve 246 such that a burst of pressurized liquid will flow from second reservoir 270 to actuator 11 in order to set the parking brake unit 2A. Of course, as evident from the fluid circuit including pump 229, lines 232, 243 and 247 and valve 246, actuator 11 can be directly pressurized by pump 229 as well.

With the above description, it should be readily apparent that only minimal force is needed to set the parking brake unit 2A and a consistent braking force will be developed regardless of the particular strength of the operator. Tests have shown a brake holding force in accordance with the invention as high as 94.2% of emergency air brake forces. In addition, the parking brake system of the invention can be readily retrofitted to existing railway cars, as well as easily incorporated when building new railway vehicles, in either of the static and pressure operating modes. It should also be readily apparent that a static system can be easily converted to a pressure system by the mere plugging of a reservoir 39 incorporated in the static system and interconnecting the static parking brake unit 2A and the pressure circuit 202 through line 247. Of course, if designed for specific use as a pressure system, the reservoir 39 can be eliminated.

Figure 5:
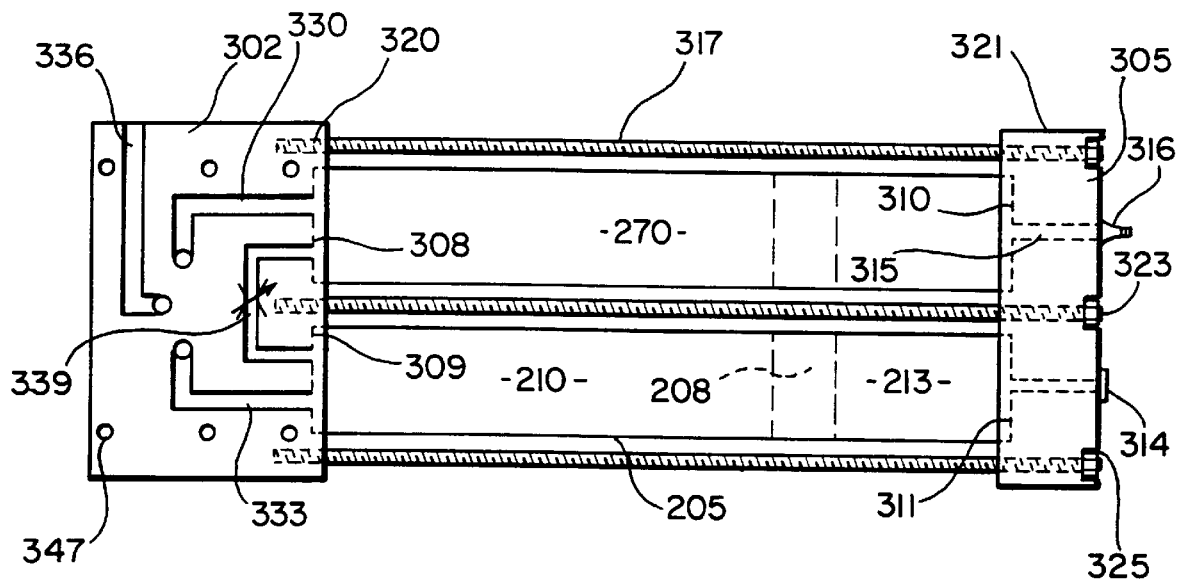
FIG. 5 illustrates a preferred assembly of various components of the system of FIG. 4.

Furthermore, since the components of the parking brake unit 2A are preferably assembled into a single unit, attachment of the parking brake unit 2A to a railway car is extremely simple, only requiring two connections. For similar reasons, it is preferable to pre-assembly the pressure circuit 202 into a single unit. With reference to FIG. 5, first reservoir 205 and second reservoir 270 are incorporated into a single unit. In a manner similar to the mounting of the cylinder 164 and the reservoir 171 in the parking brake unit 2C of FIG. 3, reservoir 205 and reservoir 270 are mounted between first and second end cap members 302 and 305. More specifically, first and second end cap members 302 and 305 are counter bored at 308–311 to sealingly receive respective ends of first reservoir 205 and second reservoir 270. In addition, the second end cap member 305 is formed with a vent hole 314 for the reservoir 205 and a passage 315 which opens into second reservoir 270. Passage 315 leads to a valve 316 which projects from second end cap member 305 for pre-charging pressurized reservoir 270 with a gas, such as nitrogen, in the preferred embodiment. Of course, other types of known pressurized fluid reservoir could also be utilized. The first and second end cap members 302 and 305 are interconnected by a plurality of tie rods 317, each of which has a first end received in a respective threaded hole 320 provided in first end cap member 302 and a second end which extends through a respective hole 321 formed in second end cap member 305 and which receives a nut 323 positioned in a respective recess 325.

Figure 6:
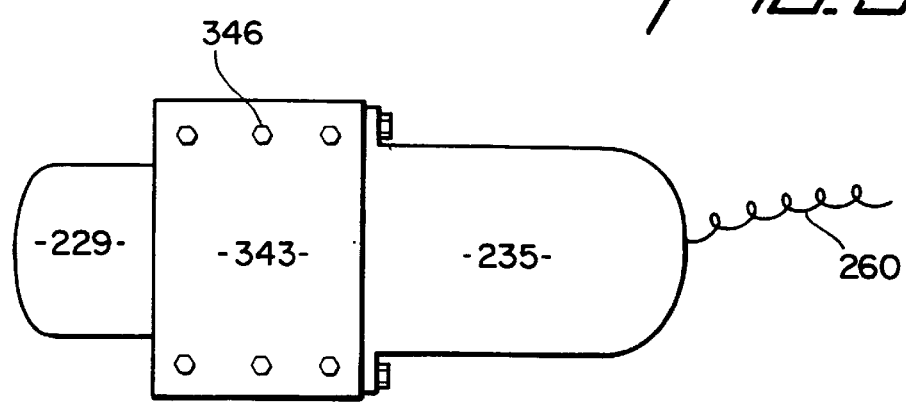
FIG. 6 illustrates a preferred assembly of various other components of the system of FIG. 4.

Also formed in first end cap member 302 are a plurality of conduits, two of which are shown at 330 and 333 which lead to and from reservoir 270 and reservoir 205 respectively, another conduit 336 leading out of first end cap member 302, and a flow line 339 interconnecting reservoir 270 and reservoir 205. These fluid passages are illustrated to show that first end cap member 302 can internally be formed with the necessary conduits and other flow lines corresponding to those outlined above in describing the preferred embodiment for dynamic pressure circuit 202. In addition, as shown in FIG. 6, pump 229 and motor 235 can be integrated such as by means of a mounting block 343. Mounting block 343 can also be formed with necessary conduits and passages (not shown) in order that mounting block 343 can be sealingly affixed upon first end cap member 302 to align and interconnect the respective conduits and passages with bolts 346 being threadably received in holes 347. In this manner, pressure circuit 202 can be formed as a single, compact unit which can be readily fluidly connected to parking brake unit 2A by interconnecting third conduit 336 with a single port, such as port 81, of the parking brake unit 2A.

Figure 7:
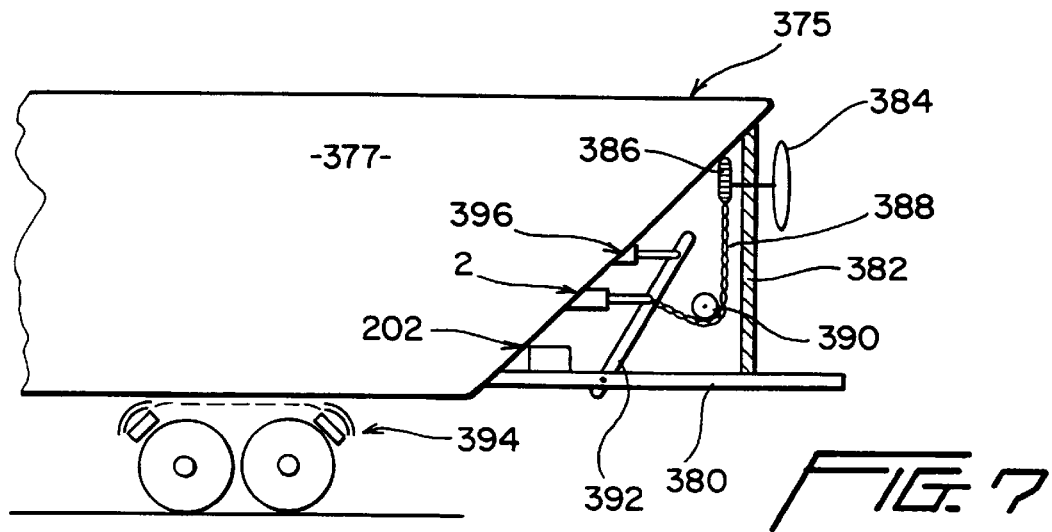
FIG. 7 illustrates a typical mounting arrangement for the parking brake system of the invention on a railway vehicle.

FIG. 7 illustrates a typical mounting arrangement for the parking brake system of the invention on a railway vehicle. As shown in this exemplary depiction, a freight car 375 includes a body 377 and platform supports 380. Extending upwards from platform supports 380 is a ladder 382 which an operator would normally climb to access a handwheel 384 which is attached to a first sprocket wheel 386. A chain 388, which also extends about a second sprocket wheel 390, links first sprocket 386 with a main service brake actuating lever arm 392. Lever arm 392 is pivotally attached to a portion of the platform supports 380 as depicted and is interconnected with brake assemblies 394 of freight car 375 through a mechanical connection (not shown). As is known in the art, a pneumatic actuator 396 extends between body 377 and lever arm 392 for the selective pivoting of lever arm 392 to cause the actuation of brake assemblies 394. In a retrofit situation, parking brake unit 2A, 2B or 2C of the invention would also be interposed between body 377 and lever arm 392. If the dynamic system of the invention was utilized, dynamic pressure circuit 202 would simply be mounted to support structure such as platform supports 380 and would be fluidly connected to parking brake unit 2A in the manner described in detailed above. Of course, this figure only represents a preferred manner of incorporating the parking brake system of the invention into a known railway car brake arrangement and therefore it should be understood that the parking brake system could be effectively employed in various other manners.

From the above description, it should be readily apparent that the parking brake system of the present invention is compact, can be readily install either on existing or new railway vehicles, is easy to operate and provides for improved safety of railway cars. However, although the invention has been described with reference to preferred embodiments thereof, it should be readily understood that various changes and/or modifications may be made to the invention without departing from the spirit thereof. In general, the invention is only intended to be limited by the scope of the following claims.

We claim:

1. A railway car parking brake system comprising:
    an actuator including a piston, cylinder, and an actuator rod, said piston being movably mounted within said cylinder so as to divide said cylinder into at least first and second chambers, said actuator rod having a first end portion secured to said piston for movement between extended and retracted positions and a second end portion that extends from said cylinder, one of said cylinder and the second end portion of said actuator rod being adapted to be attached to a support portion of a railway car and the other of said cylinder and the second end portion of said actuator rod being adapted to be attached to a movable railway car service brake actuating member such that movement of said piston relative to said cylinder will shift the movable railway car service brake actuating member relative to the support portion of the railway car;
    a reservoir adapted to house a supply of liquid;
    a conduit system fluidly interconnecting said reservoir to the first chamber of said cylinder; and
    at least one valve member interposed within said conduit system between said reservoir and the first chamber of said cylinder for controlling liquid flow through said conduit system, said valve member including a one-way valve arranged to continuously block liquid flow out of the first chamber towards the reservoir while permitting flow of liquid into the first chamber from the reservoir.

2. The railway car parking brake system as claimed in claim 1, wherein at least said linear actuator and said reservoir are integrated into a single unit.

3. The railway car parking brake system as claimed in claim 2, wherein said single unit comprises a unitary housing provided with a pair of spaced bores, one of which defines said cylinder and the other of which defines said reservoir.

4. The railway car parking brake system as claimed in claim 2, wherein said reservoir is concentrically mounted about said cylinder.

5. The railway car parking brake system as claimed in claim 2, wherein said single unit includes first and second end cap members between which said cylinder and said reservoir extend.

6. The railway car parking brake system as claimed in claim 5, further comprising a port extending from said reservoir through one of said first and second end cap members for at least one of filling and draining of said reservoir.

7. The railway car parking brake system as claimed in claim 5, wherein said single unit further comprises a plurality of circumferentially spaced tie rods interconnecting said first and second end cap members.

8. The railway car parking brake system as claimed in claim 5, wherein at least a portion of said conduit system is formed within said first end cap member.

9. The railway car parking brake system as claimed in claim 8, wherein said reservoir includes an internal piston which divides said reservoir into first and second chambers, said conduit system being open to the first chamber of said reservoir through said first end cap member, the second chamber of said reservoir being vented to atmosphere.

10. The railway car parking brake system as claimed in claim 1, wherein said reservoir includes an internal piston which divides said reservoir into first and second chambers, said conduit system being open to the first chamber of said reservoir and the second chamber of said reservoir being vented to atmosphere.

11. The railway car parking brake system as claimed in claim 1, wherein said valve member is also arranged to selectively permit the supply of liquid in the reservoir to be drawn into the first chamber of said cylinder and returned to the reservoir by the movement of the piston within said cylinder.

12. The railway car parking brake system as claimed in claim 1, further comprising a venting passage opening the second chamber of said cylinder to atmosphere.

13. The railway car parking brake system as claimed in claim 1, wherein said at least one valve member includes a flow control valve adapted to be selectively shifted to an open position wherein liquid is free to flow to and from the first chamber of said cylinder and a closed, flow-through preventing position.

14. The railway car parking brake system as claimed in claim 13, wherein said one-way valve comprises a check valve.

15. The railway car parking brake system as claimed in claim 13, wherein said flow control valve comprises a manually actuated valve.

16. The railway car parking brake system as claimed in claim 1, further comprising:
a pump having an input in fluid communication with said reservoir and an output in fluid communication with said first chamber of said cylinder, said one-way valve located between said pump and said first chamber.

17. The railway car parking brake system as claimed in claim 16, further comprising a second pressurized reservoir connected to the output side of said pump, a pressure relief valve, responsive to sensed pressure of liquid delivered to said second reservoir from said pump, arranged parallel to said second reservoir for diverting a flow of liquid from said pump to the first recited reservoir.

18. The railway car parking brake system as claimed in claim 17, wherein both reservoirs are integrated into a single unit.

19. The railway car parking brake system as claimed in claim 18, wherein said single unit includes first and second end cap members between which said both reservoirs are mounted.

20. The railway car parking brake system as claimed in claim 19, wherein said first end cap member is formed with a plurality of internal conduits terminating at mounting ports.

21. The railway car parking brake system as claimed in claim 20, including a motor drivingly connected to said pump and wherein said pump and said motor are integrated into a single unit.

22. The railway car parking brake system as claimed in claim 21, wherein said pump and said motor are interconnected through a mounting block, said mounting block being adapted to be interconnected to said first end cap member such that said reservoirs, said pump and said motor form a single assembly.

23. The railway car parking brake system as claimed in claim 17, further comprising a motor drivingly connected to said pump; and a pressure-sensitive switch in fluid communication to said second reservoir, said switch being electrically connected to said motor such that said motor is automatically activated to drive said pump when a sensed pressure in said second reservoir is below a predetermined level.

24. The railway car parking brake system as claimed in claim 23, wherein said at least one valve member includes a flow control valve adapted to be shifted to an open position wherein liquid is free to flow to and from the first chamber of said cylinder and a closed, flow-through preventing position and wherein said one-way valve is arranged in parallel to said flow control valve.

25. The railway car parking brake system as claimed in claim 24, wherein said at least one valve member includes a third valve arranged between said pump and said actuator in series with said flow control valve, said third valve being movable between a first position wherein the first chamber of said cylinder is open to said first recited reservoir and a second position wherein the output of said pump is open to said flow control valve.

26. The railway car parking brake system as claimed in claim 25, further comprising an element for biasing said third valve towards said first position.

27. A railway car parking brake system comprising:
an actuator including a piston, cylinder, and an actuator rod, said piston being movably mounted within said cylinder so as to divide said cylinder into at least first and second chambers, said actuator rod having a first end position secured to said piston for movement between extended and retracted positions and a second end portion that extends from said cylinder, one of said cylinder and the second end portion of said actuator rod being adapted to be attached to a support portion of a railway car and the other of said cylinder and the second end portion of said actuator rod being adapted to be attached to a movable railway car service brake actuating member such that movement of said piston relative to said cylinder will shift the movable railway car service brake actuating member relative to the support portion of the railway car;
a first reservoir adapted to house a supply of holding liquid;
a conduit system fluidly interconnecting said first reservoir to the first chamber of said cylinder; and
a valve unit interposed within said conduit system between said first reservoir and the first chamber of said cylinder, said valve unit being adjustable between a first position wherein holding liquid can freely flow between the first chamber of said cylinder and the reservoir and a second position wherein holding liquid can only flow from said first reservoir towards the first chamber of said cylinder and not in a reverse direction.

28. The railway car parking brake system as claimed in claim 27, further comprising a venting passage opening the second chamber of said cylinder to atmosphere.

29. The railway car parking brake system as claimed in claim 27, wherein said first reservoir and said cylinder are integrated into a single unit.

30. The railway car parking brake system as claimed in claim 29, wherein said single unit includes first and second end cap members between which said first reservoir and said cylinder extend, said first and second end cap members being interconnected by a plurality of tie members, at least a portion of said conduit system being formed in said first end cap member.

31. The railway car parking brake system as claimed in claim 27, further comprising:
a second pressurizable reservoir for storing a quantity of holding liquid;
a pump having an input in fluid communication with said first reservoir and an output in fluid communication with said second reservoir; and
drive means connected to said pump wherein operation of said drive means causes holding liquid to be drawn from said first reservoir and delivered to said second reservoir to pressurize said second reservoir.

32. The railway car parking brake system as claimed in claim 31, further comprising a pressure-sensitive switch in fluid communication to said second reservoir, said switch being electrically connected to said drive means such that said drive means is automatically activated to drive said pump when a sensed pressure in said second reservoir is below a predetermined level.

33. The railway car parking brake system as claimed in claim 31, wherein said valve unit includes a flow control valve adapted to be shifted to an open position wherein liquid is free to flow to and from the first chamber of said cylinder and a closed, flow-through preventing position and a second one-way valve, said one-way valve being arranged in parallel to said flow control valve, said one-way valve only permitting uni-directional flow of liquid towards said first chamber therethrough.

34. The railway car parking brake system as claimed in claim 33, further comprising a third valve arranged between said pump and said actuator in series with said flow control valve, said third valve being movable between a first position wherein the first chamber of said cylinder is open to said reservoir and a second position wherein the output of said pump is open to said flow control valve.

35. The railway car parking brake system as claimed in claim 31, wherein said first and second reservoirs are integrated into a single unit.

36. The railway car parking brake system as claimed in claim 35, wherein said single unit includes first and second end cap members between which said first and second reservoirs are mounted, said first end cap member being formed with a plurality of internal conduits terminating at mounting ports.

37. The railway car parking brake system as claimed in claim 36, wherein said pump and said drive means are interconnected through a mounting block, said mounting block being adapted to be interconnected to said first end cap member such that said reservoirs, said pump and said drive means form a single assembly.

38. A method of holding a service brake system on a railway car in a desired brake setting position comprising:

interconnecting a linear actuator, including a cylinder having a piston movable therein which divides said cylinder into first and second chambers and a rod attached to said piston, between a body portion of the railway car and a lever which is shiftable by the service brake system;

connecting a holding liquid reservoir to the first chamber of said linear actuator through a holding liquid filled conduit;

interposing a one-way valve between said linear actuator and said reservoir; and continuously blocking flow of holding liquid out of the first chamber toward the reservoir while continuously permitting flow of holding liquid into the first chamber through said one-way valve as a result of piston motion in a direction enlarging said first chamber.

39. The method of holding a service brake system as claimed in claim 38, further comprising: incorporating at least said linear actuator and said reservoir into a unitary assembly.

40. The method of holding a service brake system as claimed in claim 38, further comprising:

pressurizing a holding liquid pressurizable reservoir by supplying liquid thereto from a pump which draws liquid from a holding liquid reservoir;

interposing a second valve, in series with said one-way valve, between said pressurizable reservoir and said first chamber of said cylinder; and controlling the operation of the pump in response to sensed pressure at the pressurizable reservoir.

41. The method of holding a service brake system as claimed in claim 40, further comprising: biasing said second valve towards a position which prevents the flow of liquid from the pressurizable reservoir to the first chamber of the cylinder.

42. A railway car parking brake system comprising:

an actuator including a piston, cylinder, and an actuator rod, said piston being movably mounted within said cylinder so as to divide said cylinder into at least first and second chambers, said actuator rod having a first end portion secured to said piston for movement between extended and retracted positions and a second end portion that extends from said cylinder, one of said cylinder and the second end portion of said actuator rod being adapted to be attached to a support portion of a railway car and the other of said cylinder and the second end portion of said actuator rod being adapted to be attached to a movable railway car service brake actuating member such that movement of said piston relative to said cylinder will shift the movable railway car service brake actuating member relative to the support portion of the railway car;

a reservoir adapted to house a supply of liquid;

a conduit system fluidly interconnecting said reservoir to the first chamber of said cylinder; and at least one valve member interposed within said conduit system between said reservoir and the first chamber of said cylinder for controlling liquid flow through said conduit system;

wherein said reservoir includes an internal piston which divides said reservoir into first and second chambers, said conduit system being open to the first chamber of said reservoir and the second chamber of said reservoir being vented to atmosphere.

43. The railway car parking brake system as claimed in claim 42, wherein the supply of liquid in the reservoir is drawn into the first chamber of said cylinder and returned to the reservoir by the movement of the piston within said cylinder.

44. A railway car parking brake system comprising:

an actuator including a piston, cylinder, and an actuator rod, said piston being movably mounted within said cylinder so as to divide said cylinder into at least first and second chambers, said actuator rod having a first end portion secured to said piston for movement between extended and retracted positions and a second end portion that extends from said cylinder, one of said cylinder and the second end portion of said actuator rod being adapted to be attached to a support portion of a railway car and the other of said cylinder and the second end portion of said actuator rod being adapted to be attached to a movable railway car service brake actuating member such that movement of said piston relative to said cylinder will shift the movable railway car service brake actuating member relative to the support portion of the railway car;

a reservoir adapted to house a supply of liquid;

a conduit system fluidly interconnecting said reservoir to the first chamber of said cylinder; and at least one valve member interposed within said conduit system between said reservoir and the first chamber of said cylinder for controlling liquid flow through said conduit system; and a venting passage opening the second chamber of said cylinder to atmosphere.

45. A railway car parking brake system comprising:

an actuator including a piston, cylinder, and an actuator rod, said piston being movably mounted within said cylinder so as to divide said cylinder into at least first and second chambers, said actuator rod having a first end portion secured to said piston for movement between extended and retracted positions and a second end portion that extends from said cylinder, one of said cylinder and the second end portion of said actuator rod being adapted to be attached to a support portion of a railway car and the other of said cylinder and the second end portion of said actuator rod being adapted to be attached to a movable railway car service brake actuating member such that movement of said piston relative to said cylinder will shift the movable railway car service brake actuating member relative to the support portion of the railway car;

a reservoir adapted to house a supply of liquid;

a conduit system fluidly interconnecting said reservoir to the first chamber of said cylinder; and at least one valve member interposed within said conduit system between said reservoir and the first chamber of said cylinder for controlling liquid flow through said conduit system;

wherein said at least one valve member includes a first valve adapted to be shifted to an open position wherein liquid is free to flow to and from the first chamber of said cylinder and a closed, flow-through preventing position and a second valve, said second valve being arranged in parallel to said first valve, said second valve always permitting unidirectional flow of liquid towards said first chamber therethrough.

46. The method according to claim 38, including continuously venting said second chamber to atmosphere.

47. A method of holding a service brake system on a railway car in a desired brake setting position comprising:

interconnecting a linear actuator, including a cylinder having a piston movable therein which divides said cylinder into first and second chambers and a rod attached to said piston, between a body portion of the railway car and a lever which is shiftable by the service brake system;

connecting a holding liquid reservoir to the first chamber of said linear actuator through a holding liquid filled conduit;

interposing a one-way valve between said linear actuator and said reservoir; and continuously blocking flow of holding liquid out of the first chamber toward the reservoir while continuously permitting flow of holding liquid into the first chamber through said one-way valve, including selectively pumping pressurized holding liquid from the reservoir to the first chamber through said one-way valve to actuate said lever towards a brake setting position with the pump located between the one-way valve and the reservoir.

48. The method according to claim 47, including selectively enabling free flow of holding liquid between said reservoir and said first chamber in parallel with said one-way valve.

49. The method according to claim 47, including continuously venting said second chamber to atmosphere.

50. The method according to claim 48, including continuously venting said second chamber to atmosphere.

\* \* \* \* \*